US007844744B2

(12) United States Patent
Abercrombie et al.

(10) Patent No.: US 7,844,744 B2
(45) Date of Patent: Nov. 30, 2010

(54) PROVIDING SERVER SECURITY VIA A SECURITY SENSOR APPLICATION SHARED BY MULTIPLE OPERATING SYSTEM PARTITIONS

(75) Inventors: David K. Abercrombie, Alpharetta, GA (US); Aaron Ches Brown, Austin, TX (US); Robert George Kovacs, Austin, TX (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 12/109,452

(22) Filed: Apr. 25, 2008

(65) Prior Publication Data
US 2009/0271494 A1 Oct. 29, 2009

(51) Int. Cl.
*G06F 15/16* (2006.01)
*G06F 15/173* (2006.01)
*G06F 9/00* (2006.01)
*G06F 17/00* (2006.01)

(52) U.S. Cl. .......................... 709/250; 726/11; 726/13; 726/27; 718/1; 710/36; 709/225; 709/229; 709/238

(58) Field of Classification Search .................. 709/225, 709/229, 238, 250; 726/11, 13, 27; 718/1; 710/36
See application file for complete search history.

(56) References Cited

U.S. PATENT DOCUMENTS

| 6,880,021 B2* | 4/2005 | Easton et al. .................. 710/5 |
| 7,415,035 B1* | 8/2008 | Muller et al. ............... 370/463 |
| 2006/0185011 A1* | 8/2006 | Cromer et al. ................ 726/13 |
| 2007/0011272 A1* | 1/2007 | Bakke et al. ................ 709/217 |
| 2008/0016570 A1* | 1/2008 | Capalik ....................... 726/23 |
| 2008/0222309 A1* | 9/2008 | Shanbhogue ................ 709/250 |
| 2009/0328193 A1* | 12/2009 | Moore et al. .................. 726/15 |

* cited by examiner

*Primary Examiner*—Philip J Chea
(74) *Attorney, Agent, or Firm*—Dillon & Yudell LLP

(57) ABSTRACT

When a hypervisor in a computer server receives input/output (I/O) data traffic, the hypervisor sends the I/O data traffic to a security sensor application shared by multiple operating system (OS) partitions. If the security sensor application indicates that the I/O data traffic meets pre-defined security standards in the security sensor application, and the I/O data traffic is addressed to one of the OS partitions in the computer server, the hypervisor sends the I/O data traffic to the applicable OS partition. If the I/O data traffic meets the pre-defined security standards, and the I/O data traffic is not addressed to one of the OS partitions, the hypervisor sends the I/O data traffic to an external destination in a network coupled to the computer server.

18 Claims, 10 Drawing Sheets

PROVIDING SERVER SECURITY VIA A SECURITY SENSOR APPLICATION SHARED BY MULTIPLE OPERATING SYSTEM PARTITIONS

BACKGROUND OF THE INVENTION

1. Technical Field

The present invention relates in general to data processing and in particular to computer server security. Still more particularly, the present invention relates to an improved method and system for providing server security.

2. Description of the Related Art

Partitioned enterprise computer server systems include multiple operating system (OS) partitions and software and/or firmware, referred to herein as a Hypervisor, which passes messages between the OS partitions. The Hypervisor also enables the OS partitions to communicate with a Virtual Input/Output Server (VIOS). Enterprise server systems also include software applications that provide security against incoming malicious Input/Output (I/O) traffic, such as the Internet Security Systems (ISS) security sensor (SS). As utilized herein, a SS refers to an application program that provides network intrusion detection and prevention mechanisms.

In conventional enterprise server systems, the ISS is located in the user space of each OS. Each OS partition within the enterprise server system therefore has a separate copy of the SS code in the user space of the OS. Maintaining multiple copies of the SS code for each partition is inefficient, complex, and costly to manage. Furthermore, SS code running within user space may not be able to communicate directly with a memory and/or a network adapter, thereby impairing system performance.

SUMMARY OF AN EMBODIMENT

Disclosed are a method, system, and computer program product for providing server security. When a hypervisor in a computer server receives input/output (I/O) data traffic, the hypervisor sends the I/O data traffic to a security sensor application shared by multiple operating system (OS) partitions. If the security sensor application indicates that the I/O data traffic meets pre-defined security standards in the security sensor application, and the I/O data traffic is addressed to one of the OS partitions in the computer server, the hypervisor sends the I/O data traffic to the applicable OS partition. If the I/O data traffic meets the pre-defined security standards, and the I/O data traffic is not addressed to one of the OS partitions, the hypervisor sends the I/O data traffic to an external destination in a network coupled to the computer server.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
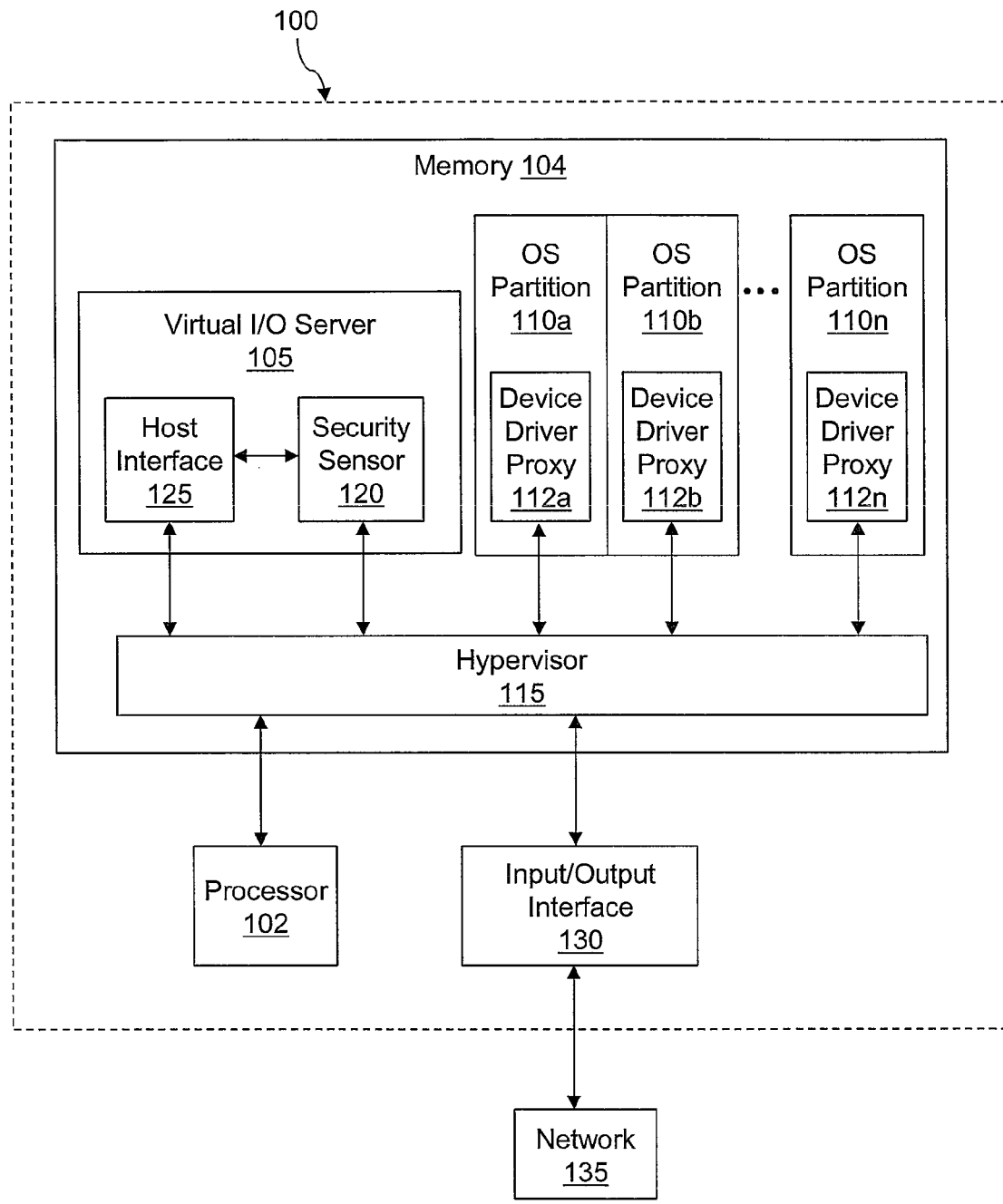
FIG. 1 depicts a high level block diagram of an exemplary computer server system, according to an embodiment of the present invention.

With reference now to FIG. 1, there is depicted a block diagram of an exemplary server 100, with which the present invention may be utilized. As shown, server 100 includes processor 102, which is coupled to memory 104. Server 100 also includes Input/Output (I/O) interface 130. I/O interface 130 enables server 100 to communicate with network 135, which includes multiple computers and/or servers that may be configured similarly to server 100. An example of I/O interface 130 is a Peripheral Component Interface (PCI), PCI-X, or PCI Express Adapter.

In one embodiment, memory 104 includes virtual I/O server (VIOS) 105 and multiple operating system (OS) partitions 110a through 110n. VIOS 105 and OS partitions 110a-110n are logically coupled to hypervisor 115 for communication therebetween. In one embodiment, I/O interface 130 is also coupled to hypervisor 115. Hypervisor 115 routes data between different components in memory 104 according to the process illustrated in FIGS. 2-3, which are described below. OS partitions 110a-110n communicate with VIOS 105 via hypervisor 115. Similarly, data traffic coming in and/or out of I/O interface 130 passes through VIOS 105 via hypervisor 115.

According to the illustrative embodiment, VIOS 105 includes one or more application programs, such as security sensor (SS) 120 and host interface 125. Host interface 125 provides I/O functionality to VIOS 105 and routes data traffic to SS 120, which determines whether or not the data traffic meets pre-defined security standards. SS 120 thus protects VIOS 105 and OS partitions 110a-110n from malicious I/O data traffic. In one embodiment, a network administrator enters the pre-defined security standards. The pre-defined security standards may subsequently be updated as needed (e.g., if a new security threat arises).

OS partitions 110a-110n include device driver proxies 112a through 112n, respectively. Device driver proxies 112a-112n manipulate data traffic and provide output to different applications (e.g., device driver proxies in other OS partitions and/or applications in computers within network 135).

Figure 2:
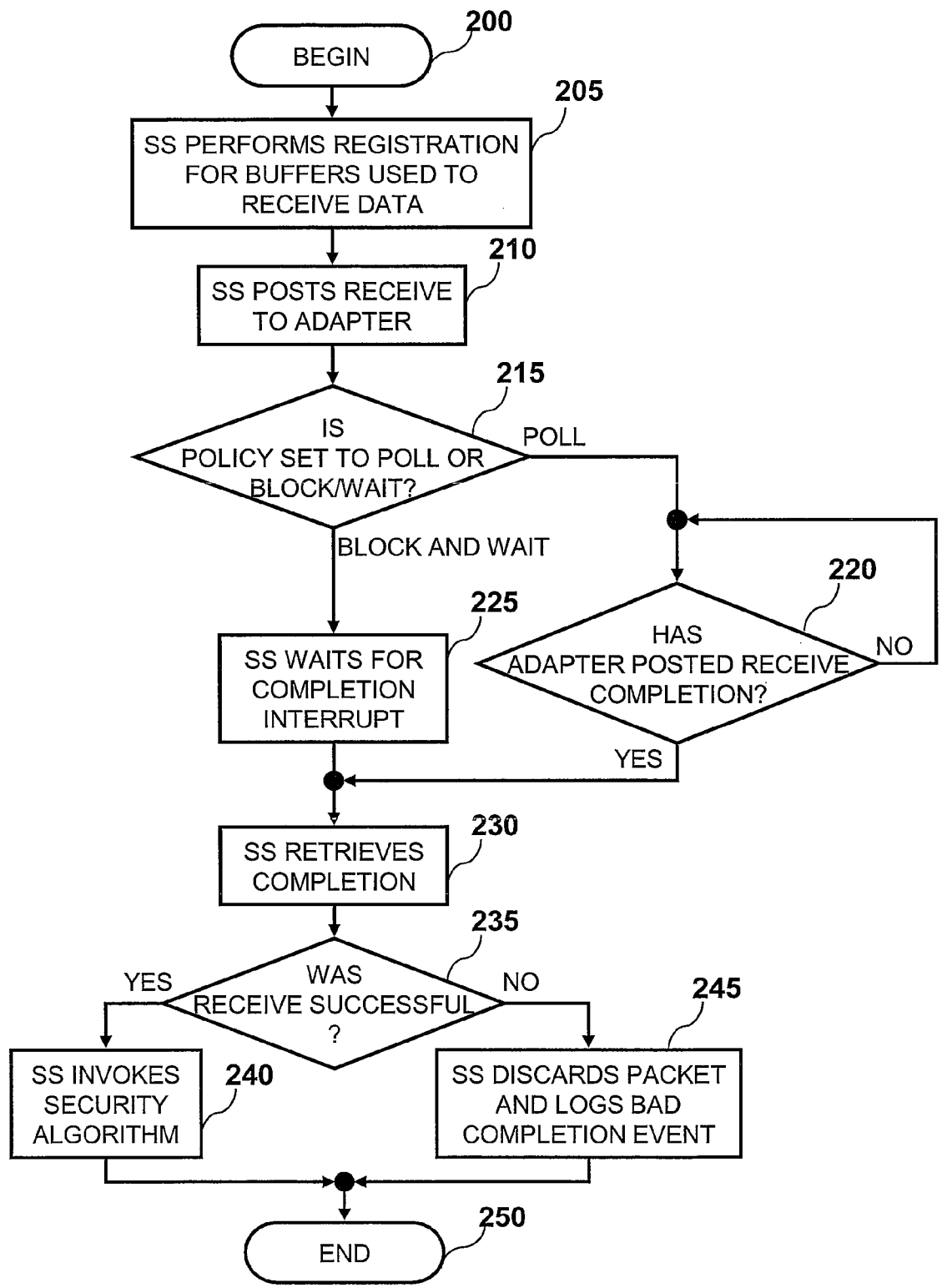
FIG. 2 is a high level logical flowchart of an exemplary method of receiving data in the computer system of FIG. 1, according to an embodiment of the invention.

With reference now to FIG. 2, there is illustrated a high level logical flowchart of an exemplary method of receiving data in server 100 of FIG. 1, according to an embodiment of the invention. The process begins at block 200. SS 120 (FIG. 1) performs a registration procedure (not shown) to initialize one or more buffers that receive incoming data packets in server 100, as depicted in block 205. SS 120 posts a receive messages notification to hypervisor 115 (FIG. 1), which receives incoming message packets from I/O interface 130 (FIG. 1), as shown in block 210.

At block 215, SS 120 determines whether or not an incoming message setting in hypervisor 115 is set to a "poll" value or a "block and wait" value. If an incoming message setting is set to a "poll" value, SS 120 determines whether or not an adapter (e.g., I/O interface 130) in server 100 has posted a notification to hypervisor 115 in response to completely receiving a message packet (i.e., a "receive completion" notification). If an adapter has not posted a receive completion notification, the process returns to block 220. Once an adapter posts a receive completion notification, the process proceeds to block 230.

Otherwise, if an incoming message setting is set to a "block and wait" value, SS 120 waits for hypervisor 115 to perform a message completion interrupt, as depicted in block 225. SS 120 subsequently retrieves a receive completion from hypervisor 115, as shown in block 230.

At block 235, SS 120 determines whether or not a message packet was received successfully (i.e., without data integrity errors). If the message packet was received successfully, SS 120 invokes the security algorithm illustrated in FIG. 3, which is described below, and the process terminates at block 250. If the message packet was not received successfully (e.g., the packet is missing data), SS 120 discards the message packet and logs a bad completion event in memory 104, as depicted in block 245. The process subsequently terminates at block 250.

Figure 3:
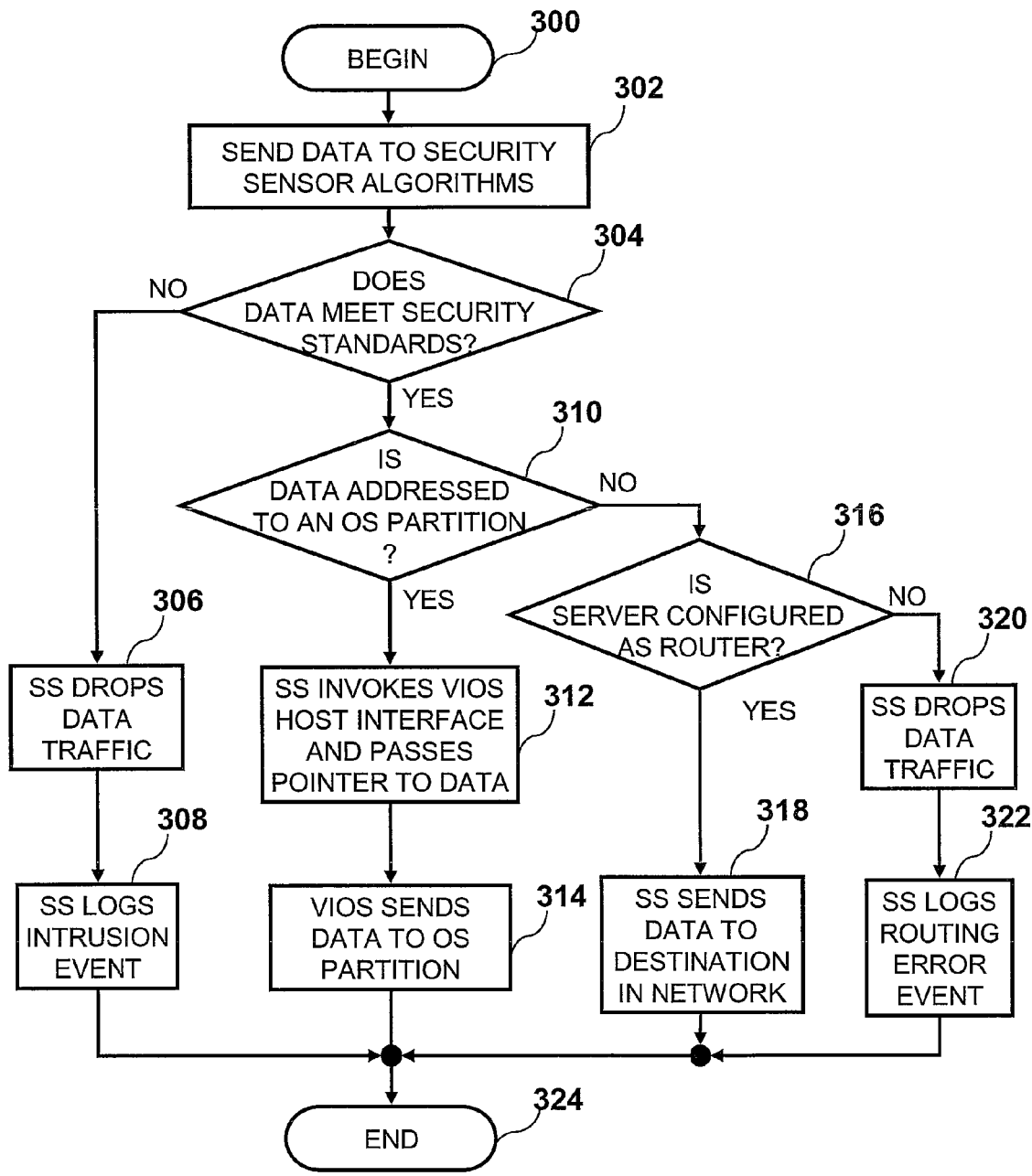
FIG. 3 is a high level logical flowchart of an exemplary method of providing server security in the computer system of FIG. 1, according to an embodiment of the invention.

With reference now to FIG. 3, there is illustrated a high level logical flowchart of an exemplary method of providing server security in server 100 of FIG. 1, according to an embodiment of the invention. The process begins at block 300. Hypervisor 115 (FIG. 1) receives one or more data packets and sends the received data traffic to a SS application (e.g., SS 120 of FIG. 1) that is shared by OS partitions 110a-110n, as shown in block 302.

At block 304, SS 120 determines whether or not the data traffic meets pre-defined security standards. If the data traffic does not meet the pre-defined security standards (i.e., the data is malicious), SS 120 drops (i.e., does not forward) the data traffic, as depicted in block 306. SS 120 logs an intrusion event that corresponds to the malicious data, as shown in block 308, and the process terminates at block 324. In another embodiment, if the data traffic is malicious, SS application may automatically output an error message, quarantine the malicious data (i.e., store the code in an isolated place), and/or delete the malicious traffic.

If the data traffic meets the pre-defined security standards (i.e., the data is safe), SS 120 releases the data traffic and determines whether or not the data traffic is addressed to one of OS partitions 110a-110n, as depicted in block 310. If the data traffic is addressed to one of OS partitions 110a-110n, SS 120 invokes host interface 125 in VIOS 105 (FIG. 1) and passes a pointer to the data traffic to host interface 125, as depicted in block 312. SS 120 sends the data traffic to the corresponding OS partition, as shown in block 314, and the process terminates at block 324.

If the data traffic is not addressed to one of OS partitions 110a-110n (i.e., the data traffic has an external destination), SS 120 determines whether or not server 100 is configured as a router, as depicted in block 316. If server 100 is configured as a router, SS 120 sends the data traffic to the corresponding destination within network 135, as shown in block 318, and the process terminates at block 324.

Otherwise, if server 100 is not configured as a router, SS 120 drops the data traffic, as depicted in block 320. SS 120 logs a routing error event that corresponds to the malicious data, as shown in block 322, and the process terminates at block 324.

Figure 4:
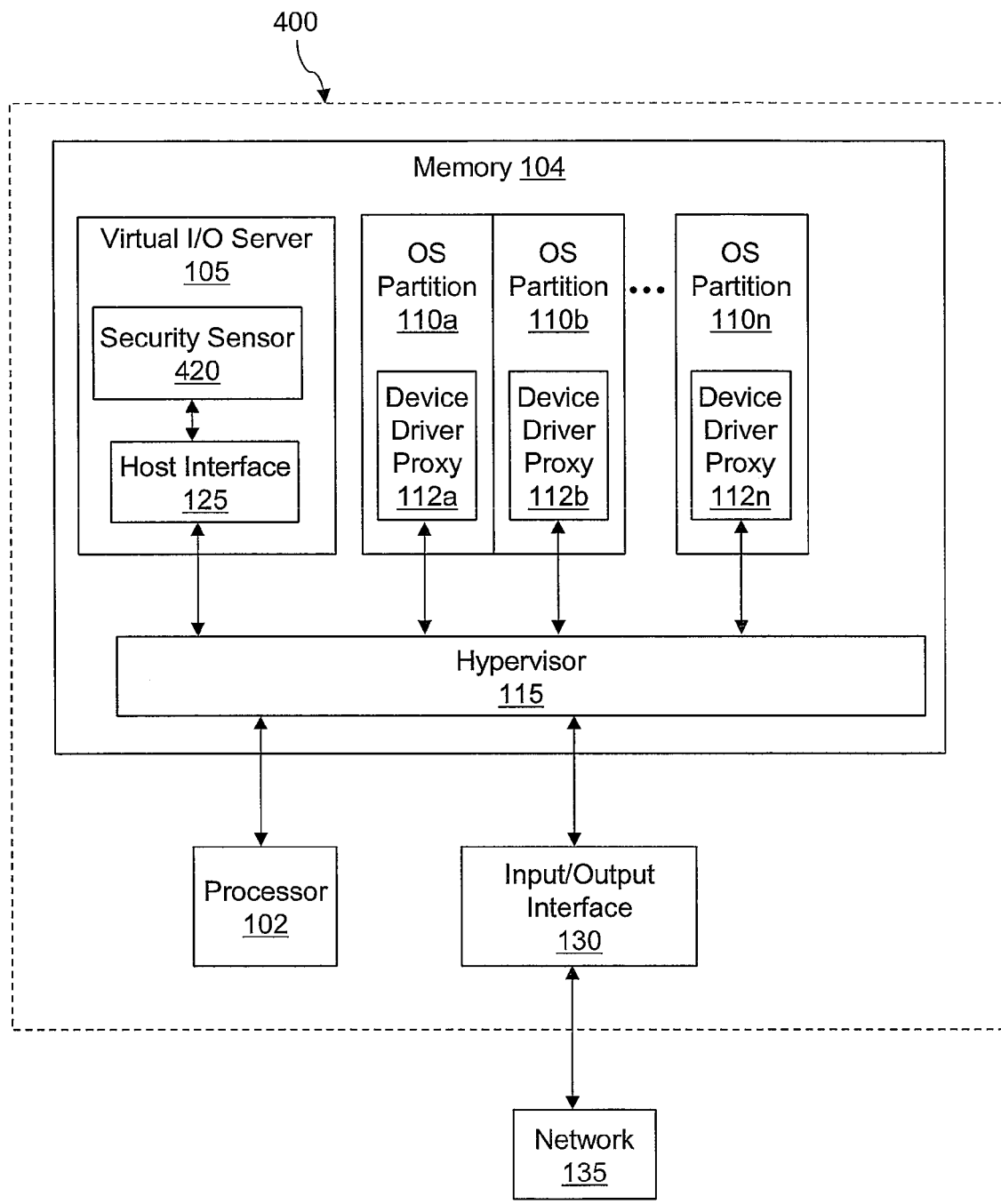
FIG. 4 depicts a high level block diagram of an exemplary computer server system, according to an alternate embodiment of the present invention.

With reference now to FIG. 4, there is depicted a block diagram of an exemplary server 400, with which the present invention may be utilized. As indicated by like reference numerals, server 400 has similar components to server 100 of FIG. 1. However, SS 420 is coupled to host interface 125, which is in turn communicably coupled to hypervisor 115. Thus, SS 420 communicates with hypervisor 115 via host interface 125. SS 420 performs the same functions as SS 120, as illustrated in FIGS. 5-6, which are described below.

Figure 5:
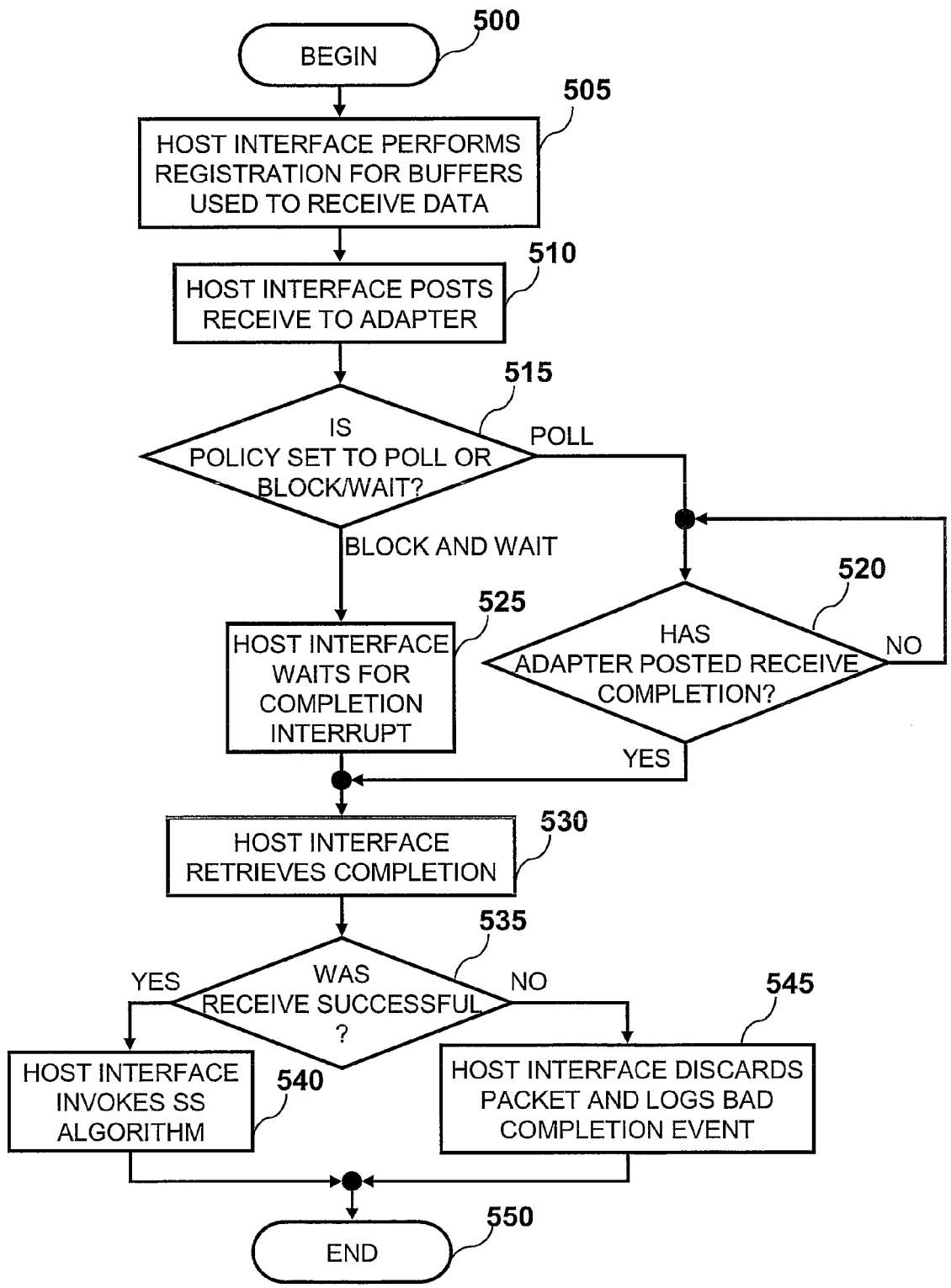
FIG. 5 is a high level logical flowchart of an exemplary method of receiving data in the computer system of FIG. 4, according to an alternate embodiment of the invention.
Figure 6:
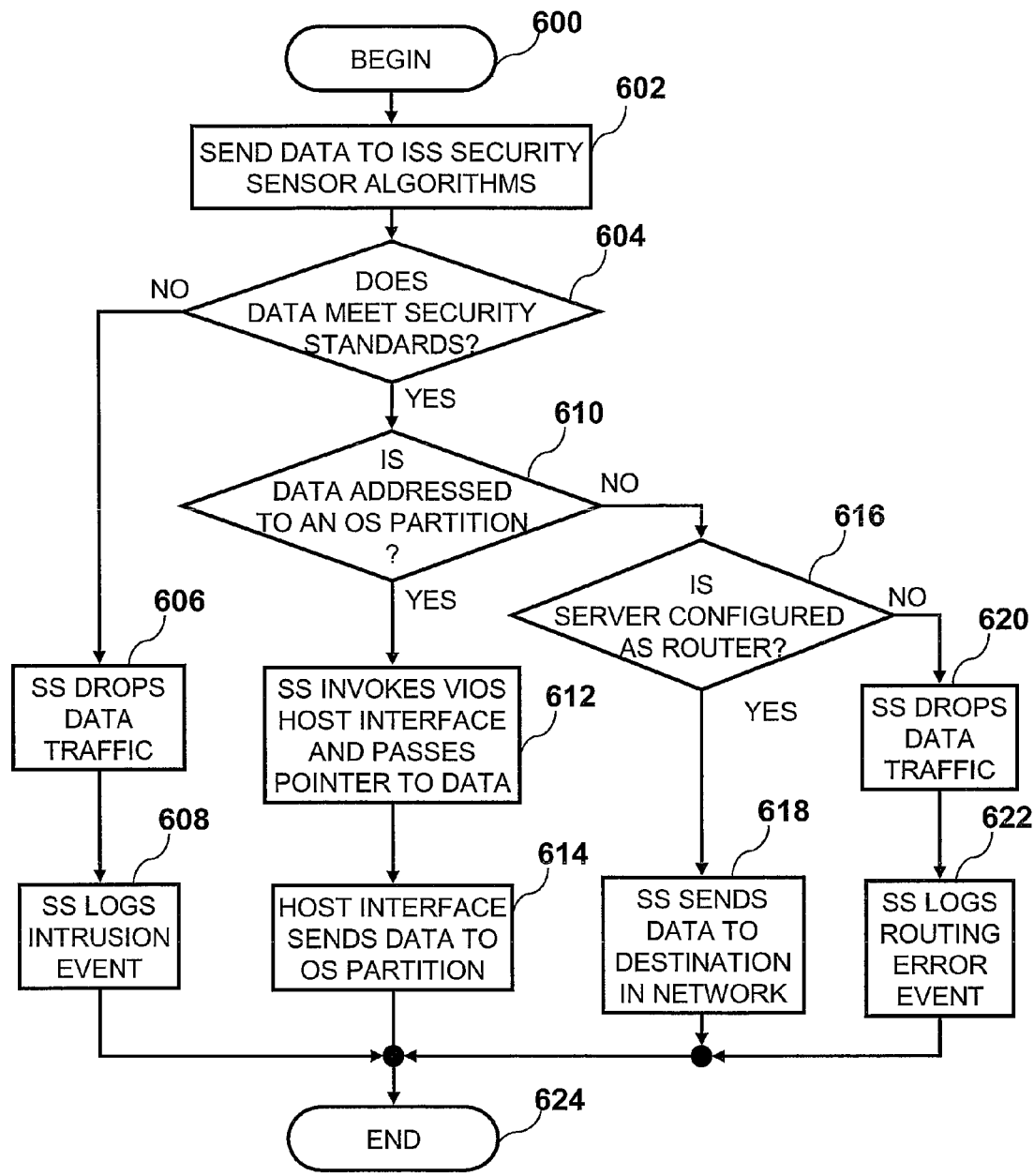
FIG. 6 is a high level logical flowchart of an exemplary method of providing server security in the computer system of FIG. 4, according to an alternate embodiment of the invention.

With reference now to FIG. 5, there is illustrated a high level logical flowchart of an exemplary method of receiving data in server 400 of FIG. 4, according to an embodiment of the invention. The process begins at block 500. Host interface 125 (FIG. 4) performs a registration procedure (not shown) to initialize one or more buffers that receive incoming data packets in server 400, as depicted in block 505. Host interface 125 posts a receive messages notification to hypervisor 115 (FIG. 4), which receives incoming message packets from I/O interface 130 (FIG. 4), as shown in block 510.

At block 515, host interface 125 determines whether or not an incoming message setting in hypervisor 115 is set to a "poll" value or a "block and wait" value. If an incoming message setting is set to a "poll" value, host interface 125 determines whether or not an adapter in server 400 has posted a notification to hypervisor 115 in response to completely receiving a message packet (i.e., a "receive completion" notification). If an adapter has not posted a receive completion notification, the process returns to block 520. Once an adapter posts a receive completion notification, the process proceeds to block 530.

Otherwise, if an incoming message setting is set to a "block and wait" value, host interface 125 waits for hypervisor 115 to perform a message completion interrupt, as depicted in block 525. Host interface 125 subsequently retrieves a receive completion from hypervisor 115, as shown in block 530.

At block 535, host interface 125 determines whether or not a message packet was received successfully (i.e., without data integrity errors). If the message packet was received successfully, host interface 125 invokes the security algorithm of SS 420 that is illustrated in FIG. 6, which is described below, and the process terminates at block 550. If the message packet was not received successfully (e.g., the packet is missing data), host interface 125 discards the message packet and logs a bad completion event in memory 104, as depicted in block 545. The process subsequently terminates at block 550.

With reference now to FIG. 6, there is illustrated a high level logical flowchart of an exemplary method of providing server security in server 400 of FIG. 4, according to an embodiment of the invention. The process begins at block 600. Hypervisor 115 (FIG. 4) receives one or more data packets and sends the received data traffic to a SS application (e.g., SS 420 of FIG. 4) that is shared by OS partitions 110a-110n, as shown in block 602.

At block 604, SS 420 determines whether or not the data traffic meets pre-defined security standards. If the data traffic does not meet the pre-defined security standards (i.e., the data is malicious), SS 420 drops (i.e., does not forward) the data traffic, as depicted in block 606. SS 420 logs an intrusion event that corresponds to the malicious data, as shown in block 608, and the process terminates at block 624. In another embodiment, if the data traffic is malicious, SS application may automatically output an error message, quarantine the malicious data (i.e., store the code in an isolated place), and/or delete the malicious traffic.

If the data traffic meets the pre-defined security standards (i.e., the data is safe), SS 420 releases the data traffic and determines whether or not the data traffic is addressed to one of OS partitions 110a-110n, as depicted in block 610. If the data traffic is addressed to one of OS partitions 110a-110n, SS 420 invokes host interface 125 in VIOS 105 (FIG. 4) and passes a pointer to the data traffic to host interface 125, as depicted in block 612. Host interface 420 sends the data traffic to the corresponding OS partition, as shown in block 614, and the process terminates at block 624.

If the data traffic is not addressed to one of OS partitions 110a-110n (i.e., the data traffic has an external destination), SS 420 determines whether or not server 400 is configured as a router, as depicted in block 616. If server 400 is configured as a router, SS 420 sends the data traffic to the corresponding destination within network 135, as shown in block 618, and the process terminates at block 624.

Otherwise, if server 400 is not configured as a router, SS 420 drops the data traffic, as depicted in block 620. SS 420 logs a routing error event that corresponds to the malicious data, as shown in block 622, and the process terminates at block 624.

Figure 7:
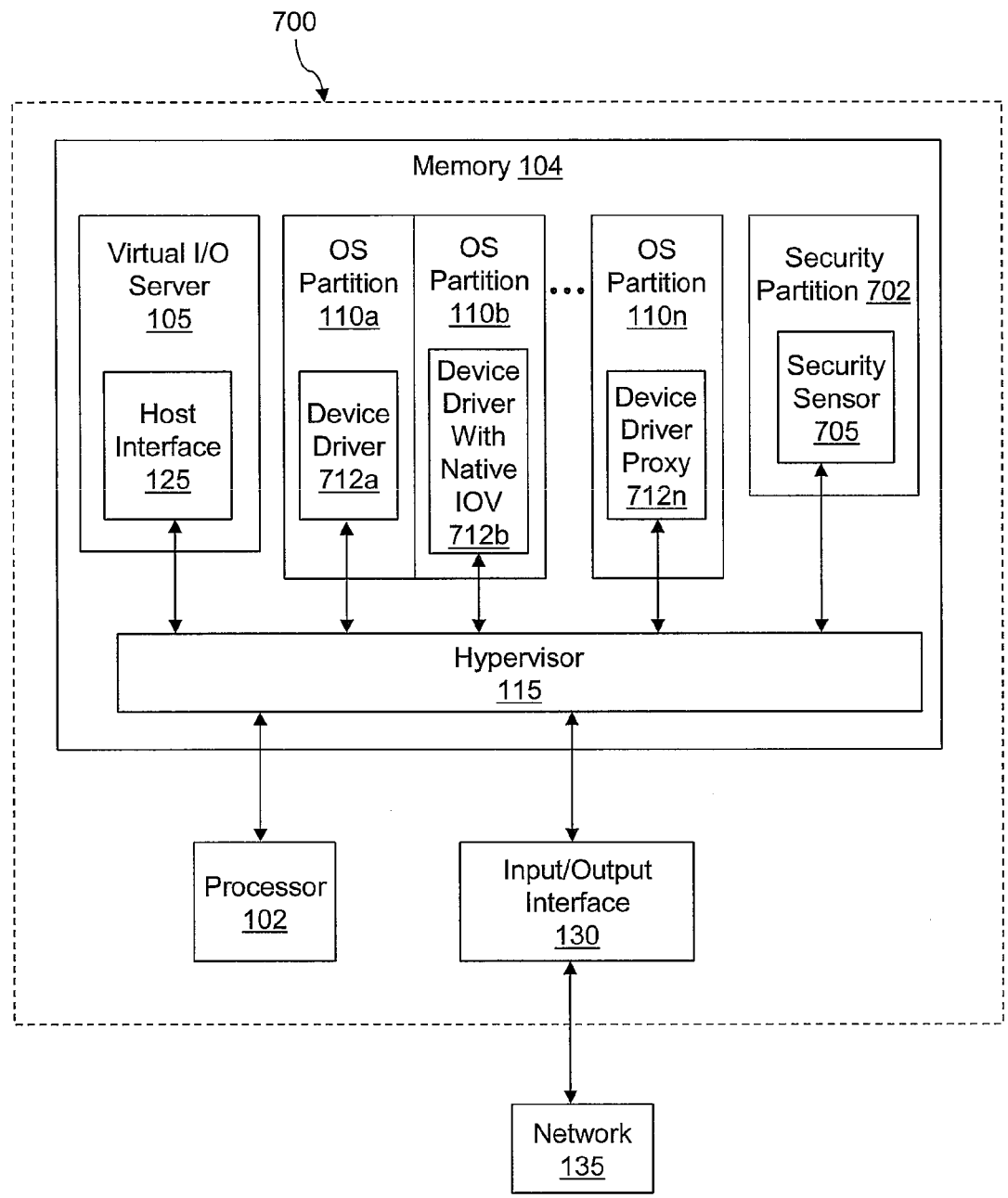
FIG. 7 depicts a high level block diagram of an exemplary computer server system, according to another embodiment of the present invention.
Figure 8:
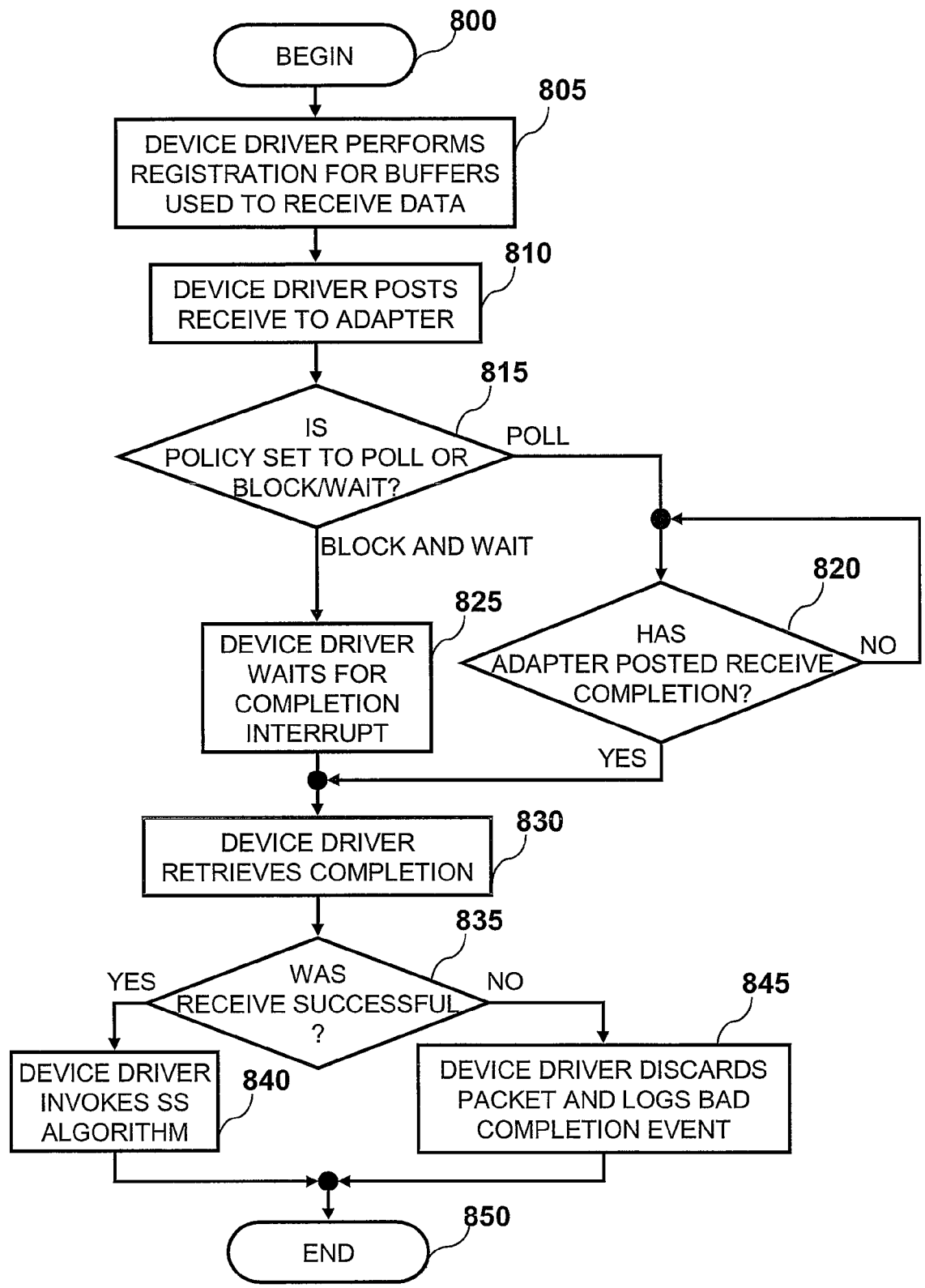
FIG. 8 is a high level logical flowchart of an exemplary method of receiving data in a computer system, in which an Input/Output (I/O) interface is dedicated to one or more operating system partitions, according to another embodiment of the invention.
Figure 9:
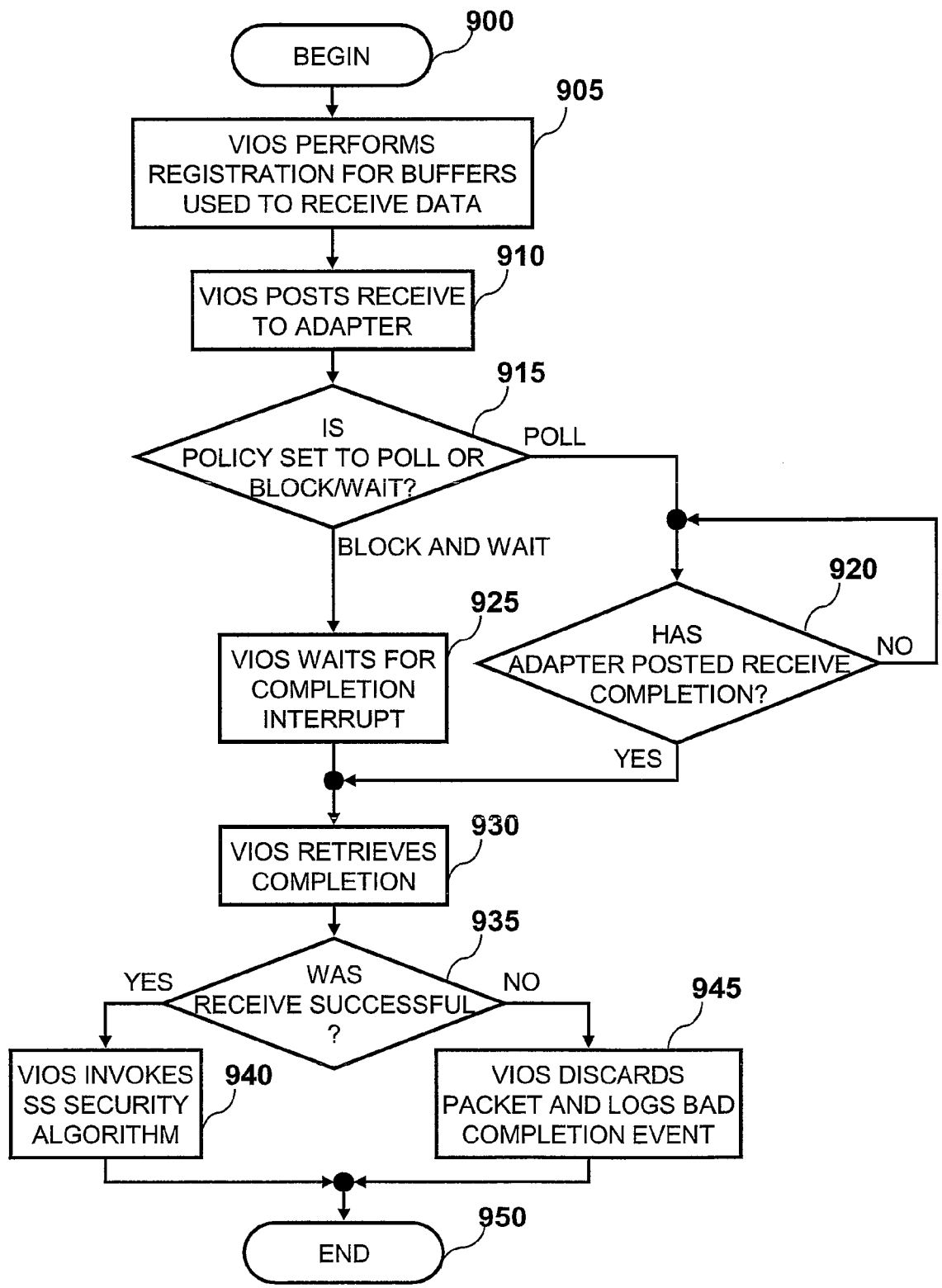
FIG. 9 is a high level logical flowchart of an exemplary method of receiving data in a computer system, in which an Input/Output (I/O) interface is shared by one or more operating system partitions through a Virtual I/O Server (VIOS), according to another embodiment of the invention.
Figure 10:
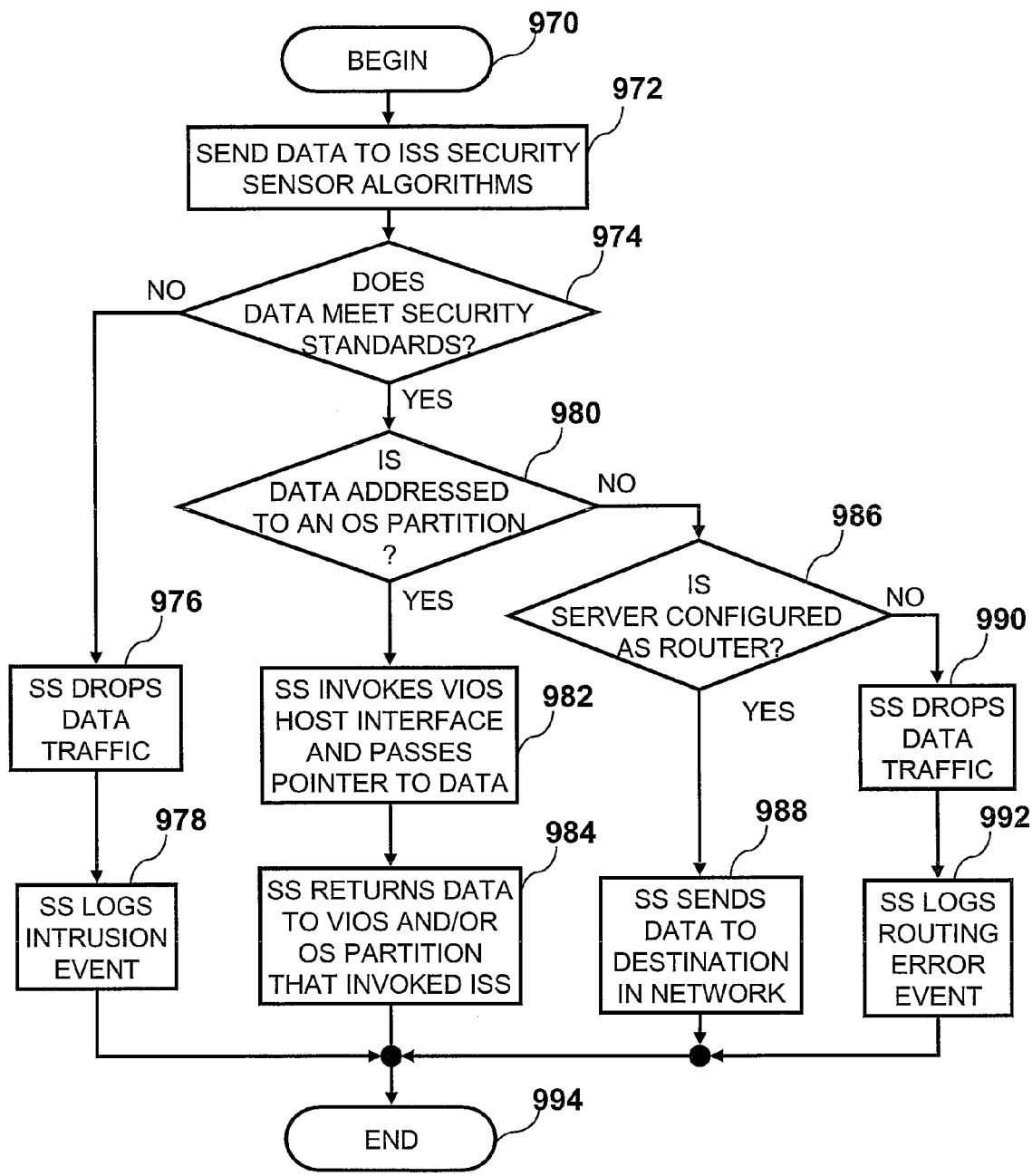
FIG. 10 is a high level logical flowchart of an exemplary method of providing server security in the computer system of FIG. 7, according to another embodiment of the invention.

With reference now to FIG. 7, there is depicted a block diagram of server 700 according to another embodiment of the present invention. As indicated by like reference numerals, server 700 has similar components to server 100 of FIG. 1. However, server 700 implements an SS 705 in a separate special purpose security partition 702 coupled to hypervisor 115, rather than in VIOS 105. In one embodiment, OS partition 110a may include device driver 712a, which is the only device driver assigned to the I/O interface 130, and/or OS partition 110b may include device driver with native I/O virtualization (IOV) 712b, which shares the I/O interface 130 with other device drivers with native IOV that reside in server 700. SS 705 performs the same functions as SS 120, as illustrated in FIGS. 8-10, which are described below. Again, server 700 only includes a single security sensor shared by all OS partitions 110a-110n. For example, if server 700 includes SS 705 in security partition 702, then server 700 does not include SS 120 in VIOS 105, and vice versa.

With reference now to FIG. 8, there is illustrated a high level logical flowchart of an exemplary method of receiving data in server 700 of FIG. 7, according to another embodiment of the invention. A device driver, such as device driver 712a (FIG. 7) or device driver with native IOV 712b (FIG. 7), performs the processes illustrated in FIG. 8. In one embodiment, device driver 712a performs the processes illustrated in FIG. 8, and OS partition 110a is the sole owner of an adapter (i.e., no other OS communicates with the adapter). In another embodiment, device driver with native IOV 712b performs the processes illustrated in FIG. 8, and OS partition 110b may directly share an adapter with one or more other OS partitions.

According to the illustrative embodiment, the process begins at block 800. The device driver performs a registration procedure (not shown) to initialize one or more buffers that receive incoming data packets in server 700, as depicted in block 805. The device driver posts a receive messages notification to hypervisor 115 (FIG. 7), which receives incoming message packets from I/O interface 130 (FIG. 7), as shown in block 810.

At block 815, the device driver determines whether or not an incoming message setting in hypervisor 115 is set to a "poll" value or a "block and wait" value. If an incoming message setting is set to a "poll" value, host interface 125 determines whether or not an adapter in server 700 has posted a notification to hypervisor 115 in response to completely receiving a message packet (i.e., a "receive completion" notification). If an adapter has not posted a receive completion notification, the process returns to block 820. Once an adapter posts a receive completion notification, the process proceeds to block 830.

Otherwise, if an incoming message setting is set to a "block and wait" value, the device driver waits for hypervisor 115 to perform a message completion interrupt, as depicted in block 825. The device driver subsequently retrieves a receive completion from hypervisor 115, as shown in block 830.

At block 835, the device driver determines whether or not a message packet was received successfully (i.e., without data integrity errors). If the message packet was received successfully, the device driver invokes the security algorithm of SS 705 that is illustrated in FIG. 10, which is described below, and the process terminates at block 850. If the message packet was not received successfully (e.g., the packet is missing data), the device driver discards the message packet and logs a bad completion event in memory 104, as depicted in block 845. The process subsequently terminates at block 850.

With reference now to FIG. 9, there is illustrated a high level logical flowchart of an exemplary method of receiving data in server 700 of FIG. 7, according to another embodiment of the invention. The process begins at block 900. VIOS 105 (FIG. 7) performs a registration procedure (not shown) to initialize one or more buffers that receive incoming data packets in server 700, as depicted in block 905. VIOS 105 posts a receive messages notification to hypervisor 115 (FIG. 7), which receives incoming message packets from I/O interface 130 (FIG. 7), as shown in block 910.

At block 915, VIOS 105 determines whether or not an incoming message setting in hypervisor 115 is set to a "poll" value or a "block and wait" value. If an incoming message setting is set to a "poll" value, VIOS 105 determines whether or not an adapter in server 700 has posted a notification to hypervisor 115 in response to completely receiving a message packet (i.e., a "receive completion" notification). If an adapter has not posted a receive completion notification, the process returns to block 920. Once an adapter posts a receive completion notification, the process proceeds to block 930.

Otherwise, if an incoming message setting is set to a "block and wait" value, VIOS 105 waits for hypervisor 115 to perform a message completion interrupt, as depicted in block 925. VIOS 105 subsequently retrieves a receive completion from hypervisor 115, as shown in block 930.

At block 935, VIOS 105 determines whether or not a message packet was received successfully (i.e., without data integrity errors). If the message packet was received successfully, VIOS 105 invokes the security algorithm of SS 705 that is illustrated in FIG. 10, which is described below, and the process terminates at block 950. If the message packet was not received successfully (e.g., the packet is missing data), VIOS 105 discards the message packet and logs a bad completion event in memory 104, as depicted in block 945. The process subsequently terminates at block 950.

Turning now to FIG. 10, there is illustrated a high level logical flowchart of an exemplary method of providing server security, according to another embodiment of the invention. The process begins at block 970. Hypervisor 115 (FIG. 7) receives one or more data packets and sends the received data traffic to a SS application (e.g., SS 705 of FIG. 7) that is shared by OS partitions 110a-110n, as shown in block 972.

At block 974, SS 705 determines whether or not the data traffic meets pre-defined security standards. If the data traffic does not meet the pre-defined security standards (i.e., the data is malicious), SS 705 drops (i.e., does not forward) the data traffic, as depicted in block 976. SS 705 logs an intrusion event that corresponds to the malicious data, as shown in block 978, and the process terminates at block 994. In another embodiment, if the data traffic is malicious, SS application may automatically output an error message, quarantine the malicious data (i.e., store the code in an isolated place), and/or delete the malicious traffic.

If the data traffic meets the pre-defined security standards (i.e., the data is safe), SS 705 releases the data traffic and determines whether or not the data traffic is addressed to one of OS partitions 110a-110n, as depicted in block 980. If the data traffic is addressed to one of OS partitions 110a-110n, SS 705 invokes host interface 125 in VIOS 105 (FIG. 7) and passes a pointer to the data traffic to host interface 125, as depicted in block 982. SS 705 returns the data traffic to VIOS 105 and/or the corresponding OS partition, as shown in block 984, and the process terminates at block 994.

If the data traffic is not addressed to one of OS partitions 110a-110n (i.e., the data traffic has an external destination), SS 705 determines whether or not server 700 is configured as a router, as depicted in block 986. If server 700 is configured as a router, SS 705 sends the data traffic to the corresponding destination within network 135, as shown in block 988, and the process terminates at block 994.

Otherwise, if server 700 is not configured as a router, SS 705 drops the data traffic, as depicted in block 990. SS 705 logs a routing error event that corresponds to the malicious data, as shown in block 992, and the process terminates at block 994.

The present invention thus provides a method of providing server security. When hypervisor 115 in computer server 100 receives I/O data traffic, hypervisor 115 sends the I/O data traffic to a security sensor (SS) application, such as SS 120 (FIG. 1) or SS 205 (FIG. 2). The SS application is shared by OS partitions 110a-110n. If the I/O data traffic meets pre-defined security standards in the SS application, and the I/O data traffic is addressed to one of OS partitions 110a-110n, hypervisor 115 sends the I/O data traffic to the OS partition. If the I/O data traffic meets the pre-defined security standards, and the I/O data traffic is not addressed to one of OS partitions 110a-110n, hypervisor 115 sends the I/O data traffic to an external destination in network 135, which is coupled to computer server 100.

It is understood that the use herein of specific names are for example only and not meant to imply any limitations on the invention. The invention may thus be implemented with different nomenclature/terminology and associated functionality utilized to describe the above devices/utility, etc., without limitation.

In the flow charts (FIGS. 2-3, 5-6, and 8-10) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer server system with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer server, a method comprising:
   in response to a hypervisor receiving input/output (I/O) data traffic:
      sending said I/O data traffic to a security sensor application shared by a plurality of operating system (OS) partitions within said computer server, wherein said security sensor application is not included within the plurality of OS partitions, wherein the I/O data traffic is addressed to one of: an external destination via routing by said computer server and one of said plurality of OS partitions within said computer server;
      determining if said computer server is configured as a router;
      in response to a determination that said I/O data traffic meets pre-defined security standards and said I/O data traffic is addressed to one of said plurality of OS partitions, sending said I/O data traffic to said one of said plurality of OS partitions;
      in response to a determination that said I/O data traffic meets said pre-defined security standards and said computer server is configured as a router and said I/O data traffic is not addressed to one of said plurality of OS partitions, dynamically routing said I/O data traffic to the external destination in a network coupled to said computer server; and
      in response to a determination that said computer server is not configured as a router and said I/O data traffic is not addressed to one of said plurality of OS partitions:
         identifying the I/O data traffic as malicious,
         logging a routing error on the I/O data traffic, and
         purging the I/O data traffic.

2. The method of claim 1, wherein said security sensor application is located in a virtual I/O server (VIOS) that is in communication with said hypervisor.

3. The method of claim 2, wherein said security sensor application communicates directly with said hypervisor.

4. The method of claim 1, wherein said security sensor application is located in a specialized security partition that is in communication with said hypervisor.

5. The method of claim 1, wherein an I/O data interface is dedicated to said plurality of OS partitions.

6. The method of claim 1, wherein an I/O data interface is shared by said plurality of OS partitions through a virtual I/O server (VIOS) that is in communication with said hypervisor.

7. A computer server system comprising:
a processor;
an input/output (I/O) interface coupled to an external network;
a memory coupled to said I/O data interface and said processor, wherein said memory is configured to store code that is configured to provide:
a hypervisor;
a plurality of operating system (OS) partitions; and
a security sensor application shared by said plurality of OS partitions, wherein said security sensor application is not included within the plurality of OS partitions; and
program instructions executing on the processor, said program instructions comprising instructions executable by said processor and configured for:
the hypervisor sending said I/O data traffic to a security sensor application shared by the plurality of operating system (OS) partitions within said computer server, wherein the I/O data traffic is addressed to one of: an external destination via routing by said computer server and one of said plurality of OS partitions within said computer server;
determining if said computer server is configured as a router;
in response to a determination that said I/O data traffic meets pre-defined security standards and said I/O data traffic is addressed to one of said plurality of OS partitions, sending said I/O data traffic to said one of said plurality of OS partitions;
in response to a determination that said I/O data traffic meets said pre-defined security standards and said computer server is configured as a router and said I/O data traffic is not addressed to one of said plurality of OS partitions, dynamically routing said I/O data traffic to the external destination in a network coupled to said computer server; and
in response to a determination that said computer server is not configured as a router and said I/O data traffic is not addressed to one of said plurality of OS partitions:
identifying the I/O data traffic as malicious,
logging a routing error on the I/O data traffic, and
purging the I/O data traffic.

8. The computer system of claim 7, wherein said security sensor application is located in a virtual I/O server (VIOS) that is in communication with said hypervisor.

9. The computer system of claim 8, wherein said security sensor application communicates directly with said hypervisor.

10. The computer system of claim 7, wherein said security sensor application is located in a specialized security partition that is in communication with said hypervisor.

11. The computer system of claim 7, wherein said I/O data interface is dedicated to said plurality of OS partitions.

12. The computer system of claim 7, wherein said I/O data interface is shared by said plurality of OS partitions through a virtual I/O server (VIOS) that is in communication with said hypervisor.

13. A computer program product comprising:
a non-transitory computer storage medium; and
program code on said computer storage medium that that when executed provides the functions of:
in response to a hypervisor of a computer server receiving input/output (I/O) data traffic:
sending said I/O data traffic to a security sensor application that is shared by a plurality of operating system (OS) partitions of the computer server, wherein said security sensor application is not included within the plurality of OS partitions, wherein the I/O data traffic is addressed to one of:
an external destination via routing by said computer server and one of said plurality of OS partitions within said computer server;
determining if said computer server is configured as a router;
in response to a determination that said I/O data traffic meets pre-defined security standards and said I/O data traffic is addressed to one of said plurality of OS partitions, sending said I/O data traffic to said one of said plurality of OS partitions;
in response to a determination that said I/O data traffic meets said pre-defined security standards and said computer server is configured as a router and said I/O data traffic is not addressed to one of said plurality of OS partitions, dynamically routing said I/O data traffic to the external destination in a network coupled to said computer server; and
in response to a determination that said computer server is not configured as a router and said I/O data traffic is not addressed to one of said plurality of OS partitions:
identifying the I/O data traffic as malicious,
logging a routing error on the I/O data traffic, and
purging the I/O data traffic.

14. The computer program product of claim 13, wherein said code for said security sensor application is located in a virtual I/O server (VIOS) that is in communication with said hypervisor.

15. The computer program product of claim 14, wherein said code for said security sensor application is in direct communication with said hypervisor.

16. The computer program product of claim 13, wherein said code for said security sensor application is located in a specialized security partition that is in communication with said hypervisor.

17. The computer program product of claim 13, wherein an I/O data interface is dedicated to said plurality of OS partitions.

18. The computer program product of claim 13, wherein an I/O data interface is shared by said plurality of OS partitions through a virtual I/O server (VIOS) that is in communication with said hypervisor.

* * * * *